US011829463B2

(12) United States Patent
Hung et al.

(10) Patent No.: US 11,829,463 B2
(45) Date of Patent: Nov. 28, 2023

(54) ELECTRONIC DEVICE WITH NON-CONTACT SENSING FUNCTION

(71) Applicant: ASUSTEK COMPUTER INC., Taipei (TW)

(72) Inventors: Chia-Hao Hung, Taipei (TW); Ming-Chih Huang, Taipei (TW); Tong-Shen Hsiung, Taipei (TW); Meng-Chu Huang, Taipei (TW); Fu-Yu Cai, Taipei (TW); Chieh Mii, Taipei (TW); Ya-Yun Huang, Taipei (TW); Minseong Kim, Taipei (TW); Shang-Chih Liang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 249 days.

(21) Appl. No.: 16/847,237

(22) Filed: Apr. 13, 2020

(65) Prior Publication Data
US 2020/0334350 A1    Oct. 22, 2020

(30) Foreign Application Priority Data

Apr. 22, 2019  (CN) .......................... 201910324470.6

(51) Int. Cl.
| *G06F 21/00* | (2013.01) |
| *H04L 29/06* | (2006.01) |
| *G06F 21/34* | (2013.01) |
| *H04B 5/00*  | (2006.01) |
| *G06F 21/44* | (2013.01) |

(52) U.S. Cl.
CPC .............. *G06F 21/34* (2013.01); *G06F 21/44* (2013.01); *H04B 5/0062* (2013.01)

(58) Field of Classification Search
CPC ........ G06F 21/34; G06F 21/44; H04B 5/0062
See application file for complete search history.

(56) References Cited

U.S. PATENT DOCUMENTS

2002/0030581 A1*  3/2002  Janiak .................... G07C 9/257
                                                      340/5.53
2008/0282850 A1*  11/2008  Luebkert .................. B25F 5/02
                                                      81/177.1
(Continued)

FOREIGN PATENT DOCUMENTS

| CN | 101571893 A | 11/2009 |
| CN | 103714285 A |  4/2014 |

(Continued)

OTHER PUBLICATIONS

Cuihua Tian; "Simulation research on IoT traffic information service based on GT4", Jan. 31, 2017, pp. 101-105; Radio Frequency Identification Technology.

*Primary Examiner* — Philip J Chea
*Assistant Examiner* — Rodman Alexander Mahmoudi
(74) *Attorney, Agent, or Firm* — Muncy, Geissler, Olds & Lowe, P.C.

(57) ABSTRACT

Provided is an electronic device, including a housing, a fixing hole, a platform and a sensor. The fixing hole is located at the housing and configured to detachably fix an identification element. The platform extends outward from the lower edge of the fixing hole. The sensor is disposed on the platform and configured to communicate with the identification element.

12 Claims, 7 Drawing Sheets

(56) References Cited

U.S. PATENT DOCUMENTS

| | | | | |
|---|---|---|---|---|
| 2010/0000481 A1* | 1/2010 | Homma | ................ | F01L 1/022 |
| | | | | 123/90.17 |
| 2010/0327802 A1* | 12/2010 | Sip | ...................... | H02J 50/10 |
| | | | | 320/108 |
| 2012/0097271 A1* | 4/2012 | Mendes | ............... | B60K 15/03 |
| | | | | 137/560 |
| 2016/0360632 A1* | 12/2016 | Lee | .................... | G06F 1/1684 |
| 2017/0079400 A1* | 3/2017 | Fereyre | ................. | A45D 1/08 |
| 2017/0264833 A1* | 9/2017 | Barnes | ................. | H04N 7/181 |
| 2020/0112110 A1* | 4/2020 | Arai | ..................... | H01R 12/75 |
| 2021/0356586 A1* | 11/2021 | Wang | .................. | G01S 7/481 |

FOREIGN PATENT DOCUMENTS

| | | |
|---|---|---|
| CN | 104915829 A | 9/2015 |
| CN | 108600443 A | 9/2018 |
| TW | 201344460 A | 11/2013 |

* cited by examiner

ELECTRONIC DEVICE WITH NON-CONTACT SENSING FUNCTION

CROSS-REFERENCE TO RELATED APPLICATION

This application claims the priority benefit of Chinese Application Serial No. 201910324470.6, filed on Apr. 22, 2019. The entirety of the above-mentioned patent application is hereby incorporated by reference herein and made a part of the specification.

BACKGROUND OF THE INVENTION

Field of the Invention

The disclosure relates to an electronic device, and in particular, to an electronic device with a non-contact sensing function.

Description of the Related Art

Different users have their own preferences and habits when operating electronic devices. To set an electronic device to an appropriate operation mode, a user often needs to enter a system program to enable a particular system function or setting. However, such an operation is complicated and time-consuming.

BRIEF SUMMARY OF THE INVENTION

The disclosure provides an electronic device. The electronic device includes a housing, a fixing hole, a platform and a sensor. The fixing hole is located on the housing and configured to detachably fix an identification element. The platform extends outward from a lower edge of the fixing hole. The sensor is disposed on the platform and configured to communicate with the identification element.

Through the electronic device provided by the disclosure, the user easily and quickly enable a particular system function or setting by disposing the identification element in the fixing hole to meet operational requirements. Therefore, the electronic device provided by the disclosure reduces the complexity of operations and saves time.

DETAILED DESCRIPTION OF THE EMBODIMENTS

Specific embodiments of the disclosure will be described in further detail below with reference to schematic drawings. The advantages and features of the disclosure will become more apparent from the following description and claims. It should be noted that the drawings are all in a very simplified form and are not drawn to accurate scale, but are merely used for convenience and clarity of description of the embodiments of the disclosure.

Figure 1:
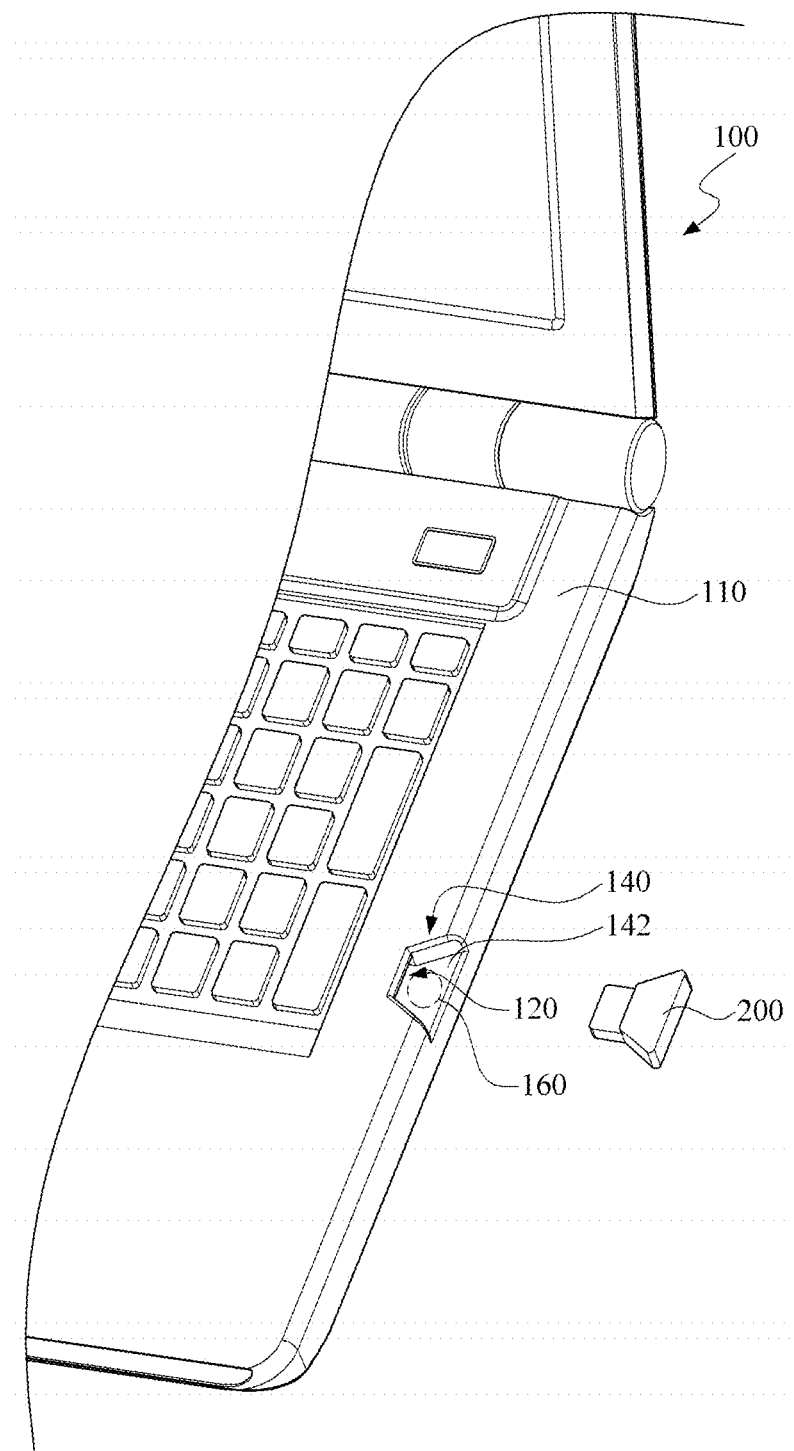
FIG. 1 is a three-dimensional schematic diagram of an embodiment of an electronic device of the disclosure.
Figure 2A:
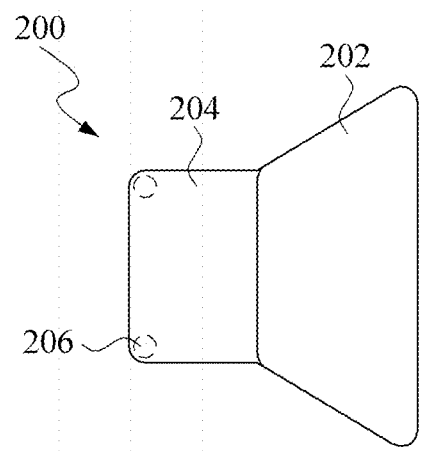
FIG. 2A to FIG. 2C are respectively a schematic top view, a schematic side view and a schematic rear view of an embodiment of an identification element of the disclosure.
Figure 2B:
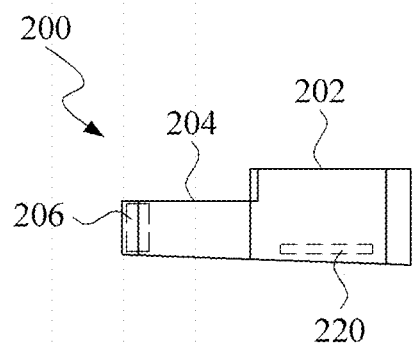
Figure 2C:
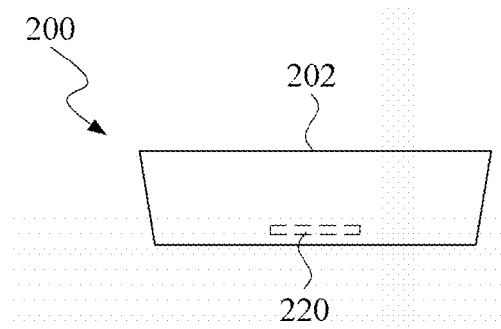
Figure 3:
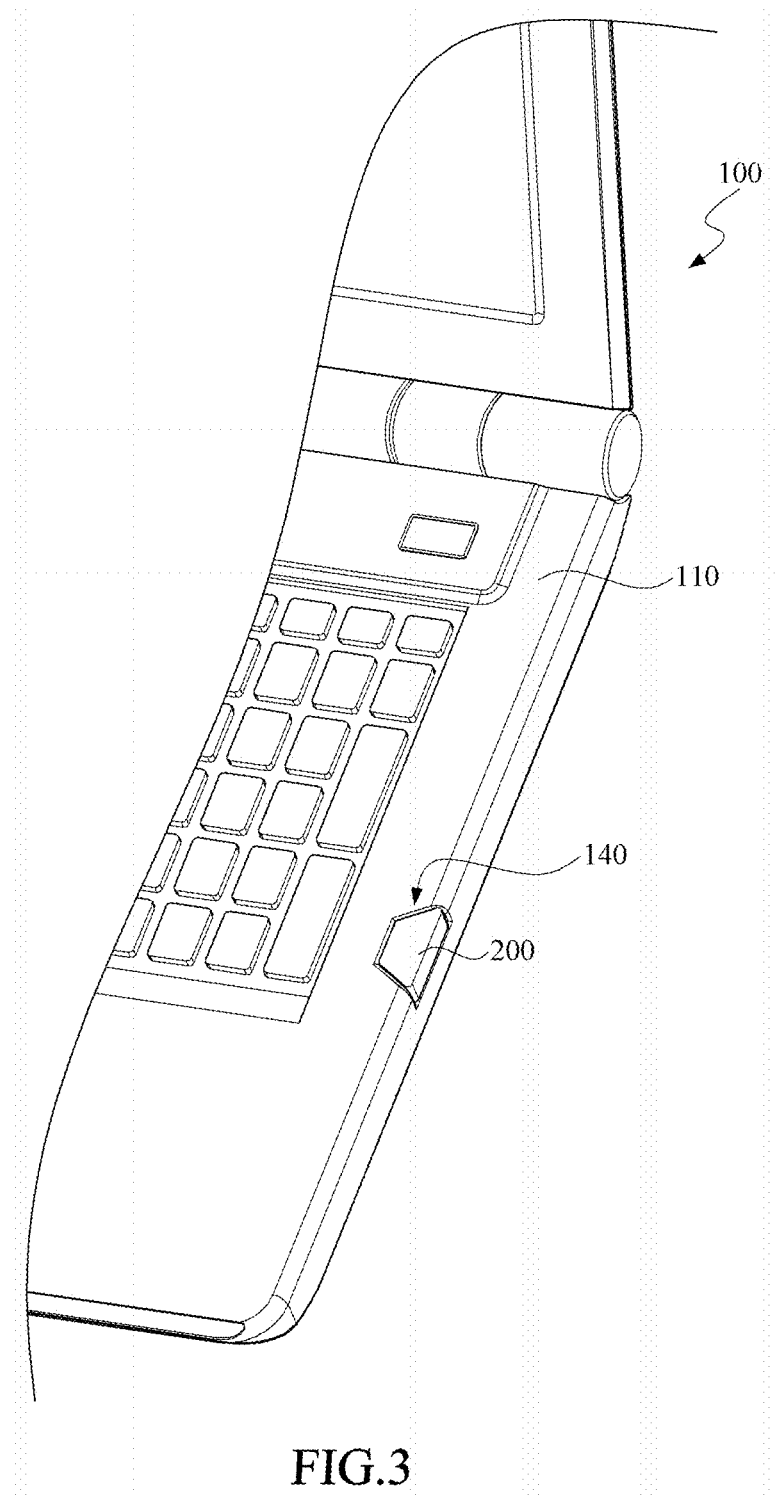
FIG. 3 is a three-dimensional schematic diagram of the identification element in FIG. 2A fixed in a fixing hole of the electronic device in FIG. 1.

FIG. 1 is a three-dimensional schematic diagram of an embodiment of an electronic device of the disclosure. FIG. 2A to FIG. 2C are respectively a schematic top view, a schematic side view and a schematic rear view of an embodiment of an identification element of the disclosure. FIG. 3 is a three-dimensional schematic diagram of the identification element fixed in a fixing hole of the electronic device in FIG. 1. In this embodiment, the electronic device 100 is a notebook computer. In some other embodiments, the electronic device 100 is a tablet computer, or other electronic devices that are able to be conducted with a non-contact sensing function.

As shown in FIG. 1, the electronic device 100 includes a housing 110, a fixing hole 120, a groove 140 and a sensor 160. The fixing hole 120 is located on the housing 110 and configured to detachably fix an identification element 200 (referring to FIG. 2A). In an embodiment, the fixing hole 120 is a magnetic fixing hole configured to detachably fix the identification element 200 by magnetic attraction. In some other embodiments, the fixing hole 120 detachably fixes the identification element 200 structuring, such as structural clamping.

In this embodiment, the fixing hole 120 is located on a side surface of the housing 110 and nears an upper surface of the housing 110. The groove 140 is located at a corner of the housing 110 and corresponding to the position of the fixing hole 120. An outer side (the right side in FIG. 1) and an upper side of the groove 140 are both opened outward to accommodate the identification element 200. In an embodiment, the shape of the groove 140 substantially corresponds to the shape of the identification element 200. The existence of the groove 140 prevents the identification element 200 fixed in the fixing hole 120 from falling or being damaged due to an external force.

The bottom of the groove 140 constitutes a platform 142, and the fixing hole 120 is located on an inner side wall (the left side in FIG. 1) of groove the 140. The platform 142 extends outward from a lower edge of the fixing hole 120. In this embodiment, the platform 142 is trapezoidal with an outer width thereof being greater than an inner width thereof to facilitate the insertion of the identification element 200 into the fixing hole 120 by the user. In some other embodiments, the platform 142 is in other shapes, such as a rectangle or a semicircle, as long as the width of the platform 142 is sufficient for the user to insert the identification element 200 into the fixing hole 120.

In an embodiment, a surface of the platform 142 is made of a rough material. The rough material enhances the firmness after the identification element 200 is inserted into the fixing hole 120.

The sensor 160 is embedded in the platform 142 and configured to perform non-contact communication with the identification element 200. In an embodiment, the sensor 160 is disposed on the platform 142 or partially extends into the fixing hole 120 to match the sensing position of identification element 200.

In an embodiment, the sensor 160 is a coil, an antenna or a near field communication component. The sensor 160 is configured to transmit a radio signal to the identification element 200, receive a radio signal from the identification element 200, and supply power to the identification element 200, so as to facilitate the setting of the identification element 200 by the user.

As shown in FIG. 2A to FIG. 2C, the identification element 200 includes a body part 202 and a protruding part 204. The body part 202 is configured for the user to hold, and the protruding part 204 is configured to be inserted into the fixing hole.

The size of a cross-section of the body part 202 is greater than that of the protruding part 204. The length of the protruding 204 corresponds to the depth by which the identification element 200 is inserted into the fixing hole 120. In addition, a magnet 206 is disposed at a front edge of the protruding part 204, for use in combination with an iron part disposed in the fixing hole 120 (not shown in the figures). In this way, the identification element 200 is fixed in the fixing hole 120 through magnetic attraction.

Figure 4:
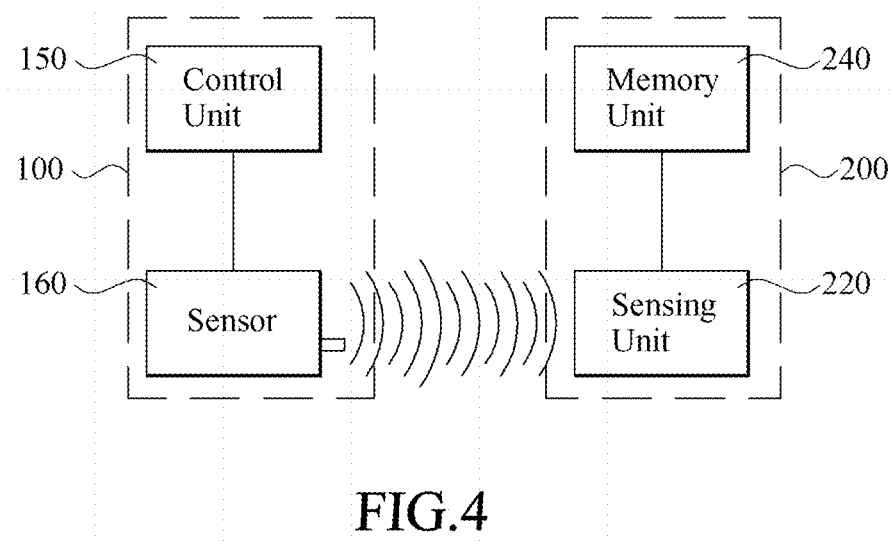
FIG. 4 is a schematic block diagram of communication between the identification element in FIG. 2A and the electronic device in FIG. 1.

FIG. 4 is a block diagram of non-contact communication between the identification element 200 in FIG. 2A and the electronic device 100 in FIG. 1.

As shown in the figure, the electronic device 100 includes a control unit 150, electrically connected to the sensor 160. In an embodiment, the control unit 150 is a chip. The control unit 150 and the sensor 160 constitute a reader configured to read information stored in the identification element 200.

The identification element 200 includes a sensing unit 220 and a memory unit 240. The sensing unit 220 is configured to communicate with the sensor 160 disposed on the platform 142. The memory unit 240 stores identification information ID, such as an identifier. In an embodiment, the identification element 200 is a non-contact sensing key, the sensing unit 220 is a coil or an antenna, and the memory unit 240 is a read-write memory.

In actual operation procedures, the user first sets the identification information ID in the memory unit 240 through the control unit 150 and the sensor 160, and assigns a corresponding system setting state to the identification information ID. Then, once the user inserts the identification element 200 into the fixing hole 120, the sensor 160 detects the identification information ID through the sensing unit 220, and notifies, according to the identification information ID, the control unit 150 to adjust the system to a corresponding system setting state. Through the above operation procedures, the user sets a plurality of different identification element 200, corresponding to a plurality of different system setting states, including hiding a disk storage area, enabling an overclocking mode, turning on a special lighting effect, executing a particular procedure, logging in to a particular account, and the like.

The user replaces the identification element 200 inserted in the fixing hole 120 according to different use scenarios, to easily and quickly switch to different system settings to meet operational requirements. In addition, when there is a plurality of identification elements 200, the identification elements 200 are of different colors for ease of distinguishing.

Figure 5:
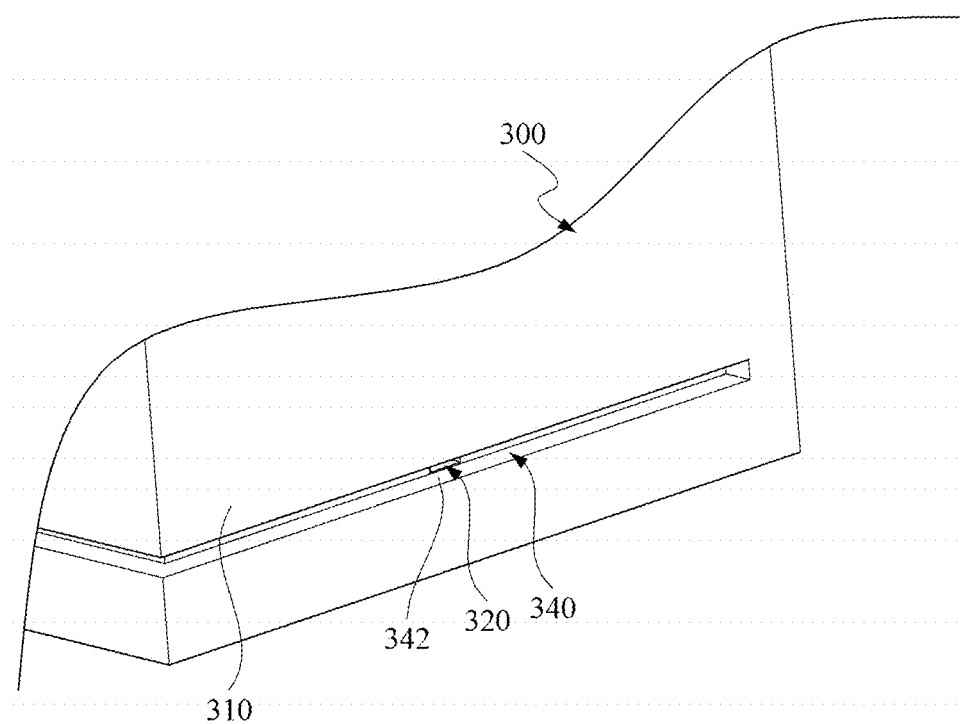
FIG. 5 is a three-dimensional schematic diagram of another embodiment of an electronic device of the disclosure.

FIG. 5 is a three-dimensional schematic diagram of another embodiment of an electronic device 300 of the disclosure. Compared with the embodiment in FIG. 1 where the fixing hole 120 is located at the side surface of the housing 110 and near the upper surface of the housing 110, in this embodiment, a fixing hole 320 is located in the middle of a side surface of a housing 310. The housing 310 of this embodiment includes a groove 340 corresponding to the position of fixing hole 320 to accommodate the identification element 200. The groove 340 extends horizontally. A side wall of the groove 340 (the side wall on the lower side) constitutes a platform 342 on which the sensor 160 is disposed. The fixing hole 320 is located at a bottom surface of the groove 340. The platform 342 extends outward from a lower edge of fixing hole 320.

Figure 6:
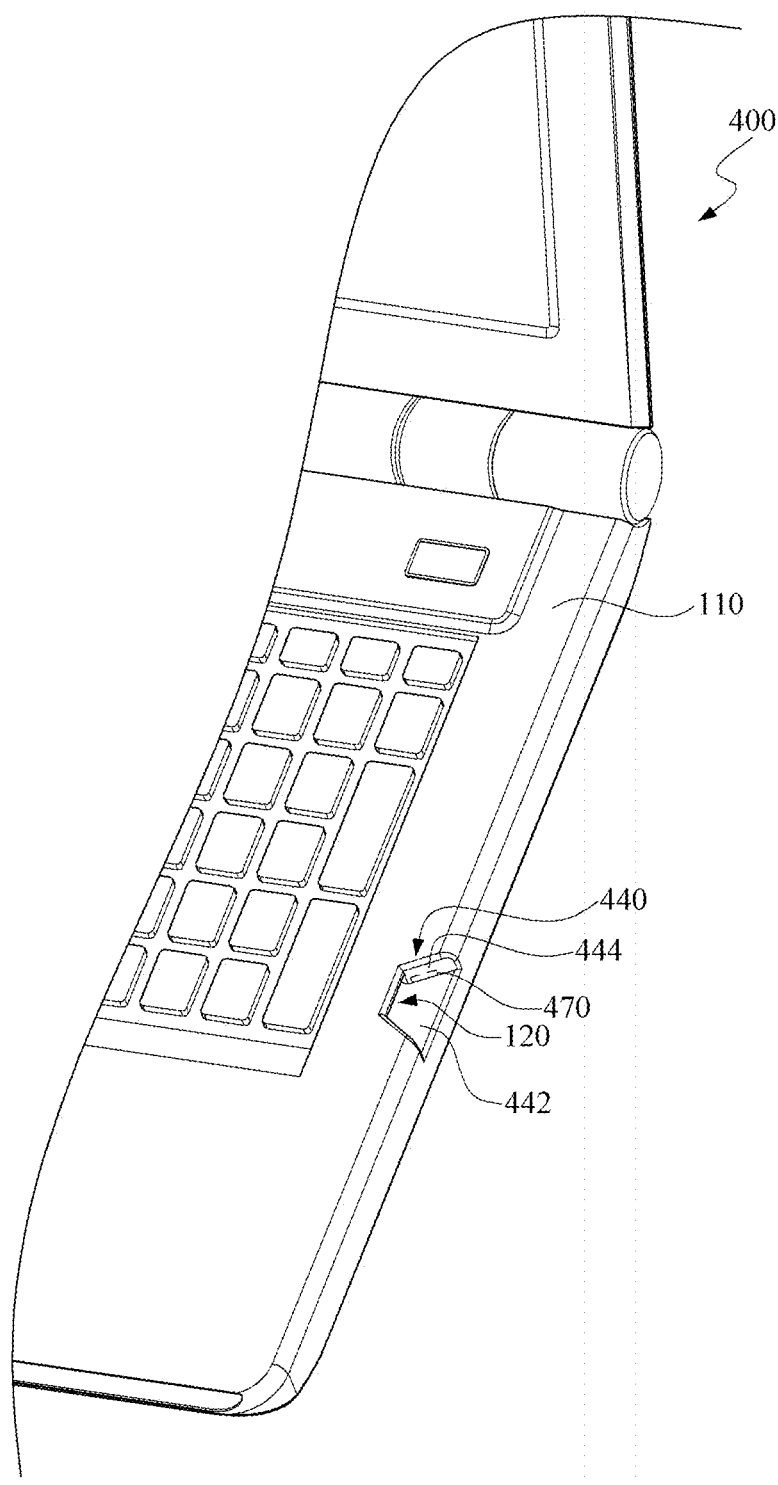
FIG. 6 is a three-dimensional schematic diagram of still another embodiment of an electronic device of the disclosure.

FIG. 6 is a three-dimensional schematic diagram of still another embodiment of an electronic device 400 of the disclosure. Compared with the embodiment in FIG. 1, the electronic device 400 of this embodiment further includes two light emitting components 470 (only one is shown in the figure) such as light-emitting diodes (LEDs) on two sides of the fixing hole 120. In this embodiment, the two light emitting components 470 are disposed on a side wall 444 of a groove 440, that is, on two side edges of the platform 442. When the sensor 160 detects that the identification element 200 is inserted into the fixing hole 120, to be specific, when the sensor 160 establishes a connection with the sensing unit 220 of the identification element 200, the control unit 150 controls the light emitting component 470 to emit light, indicating to the user that the identification element 200 is correctly inserted into the fixing hole 120.

In an embodiment, a sensor (not shown) is further disposed in the fixing hole 120 to detect whether the identification element 200 is inserted into the fixing hole 120 or not. The control unit 150 determines, based on a sensing signal of the sensor, whether to control the light emitting component 470 to emit light.

In an embodiment, the body 202 of the identification element 200 is made of a translucent material, and the light generated by the light emitting component 470 is projected outward through the body 202 of the identification element 200.

In this embodiment, two light emitting components 470 are disposed on two sides of the fixing hole 120 to notify the user that the identification element 200 is inserted into the fixing hole 120. In another embodiment, the electronic device includes a single light emitting component 470 disposed on one side of the fixing hole 120. In still another embodiment, the light emitting component 470 is disposed on the platform 442 or at an upper or lower edge of the fixing hole 120.

Compared with the prior art where the user needs to enter the system program to enable a particular system function or setting, by means of the electronic devices 100, 300 and 400 provided by the disclosure, once the user places the identification element 200 into the fixing hole 120 or 320, a particular system function or setting is easily and quickly enabled to meet operational requirements. Therefore, the electronic devices 100, 300 and 400 provided by the disclosure reduce the complexity of operations and save time.

Although the disclosure has been described with reference to the above embodiments, the embodiments are not intended to limit the disclosure. A person of ordinary skill in the art may make variations and improvements without departing from the spirit and scope of the disclosure. Therefore, the protection scope of the disclosure should be subject to the appended claims.

What is claimed is:

1. An electronic device, comprising:
a housing;
a fixing hole, located on the housing and configured to detachably fix an identification element;
a platform, extending outward from a lower edge of the fixing hole; and
a sensor, disposed on an upper surface of the platform and configured to communicate with the identification element, wherein
the housing comprises a groove,
the platform is located at the bottom of the groove,
a shape of the groove is corresponding to that of the identification element, and
the sensor is partially extended into the fixing hole.

2. The electronic device according to claim 1, wherein the sensor comprises a coil.

3. The electronic device according to claim 1, wherein the fixing hole is a magnetic fixing hole.

4. The electronic device according to claim 1, wherein the housing comprises a groove, the platform is located at the bottom of the groove, and the fixing hole is located at a side wall of the groove.

5. The electronic device according to claim 4, further comprising a light emitting component, disposed on the side wall of the grooves.

6. The electronic device according to claim 1, wherein the housing comprises a groove, the platform is located at a side wall of the groove, and the fixing hole is located at a bottom surface of the groove.

7. The electronic device according to claim 1, wherein a surface of the platform is trapezoidal.

8. The electronic device according to claim 1, wherein the sensor is a near field communication component.

9. The electronic device according to claim 1, wherein a surface of the platform is made of a rough material.

10. An electronic device, comprising:
a housing;
a fixing hole, located on the housing and configured to detachably fix an identification element;
a platform, extending outward from a lower edge of the fixing hole; and
a sensor, disposed on an upper surface of the platform and configured to communicate with the identification element,
wherein a shape of the platform is corresponding to that of the identification element, and
wherein the sensor is partially extended into the fixing hole.

11. An electronic device, comprising:
a housing;
a fixing hole, located on the housing and configured to detachably fix an identification element;
a platform, extending outward from a lower edge of the fixing hole; and
a sensor, disposed on an upper surface of the platform and configured to communicate with the identification element,
wherein the housing comprises a groove,
wherein the platform is located at the bottom of the groove,
wherein a shape of the groove is corresponding to that of the identification element,
wherein the fixing hole is a magnetic fixing hole, and
wherein the fixing hole is configured to detachably fix the identification element by magnetic attraction.

12. An electronic device, comprising:
a housing;
a fixing hole, located on the housing and configured to detachably fix an identification element;
a platform, extending outward from a lower edge of the fixing hole; and
a sensor, disposed on an upper surface of the platform and configured to communicate with the identification element,
wherein the housing comprises a groove,
wherein the platform is located at the bottom of the groove,
wherein a shape of the groove is corresponding to that of the identification element,
wherein the identification element comprises a protruding part for inserting into the fixing hole,
wherein the fixing hole has an iron part disposed therein, and
wherein the protruding part has a magnet disposed at a front edge thereof for use in combination with the iron part.

* * * * *